(12) United States Patent
Roussie

(10) Patent No.: US 7,475,476 B2
(45) Date of Patent: Jan. 13, 2009

(54) METHOD FOR PRODUCING A THREADED TUBULAR CONNECTION SEALED TO THE OUTSIDE

(75) Inventor: Gabriel Roussie, Capelle en Pevele (FR)

(73) Assignees: Vallourec Mannesmann Oil & Gas France, Aulnoye-Aymeries (FR); Sumitomo Metal Industries Ltd., Osaka-shi (JP)

(*) Notice: Subject to any disclaimer, the term of this patent is extended or adjusted under 35 U.S.C. 154(b) by 578 days.

(21) Appl. No.: 10/537,903

(22) PCT Filed: Nov. 28, 2003

(86) PCT No.: PCT/EP03/14843

§ 371 (c)(1),
(2), (4) Date: Jun. 7, 2005

(87) PCT Pub. No.: WO2004/053376

PCT Pub. Date: Jun. 24, 2004

(65) Prior Publication Data

US 2007/0039149 A1 Feb. 22, 2007

(30) Foreign Application Priority Data

Dec. 9, 2002 (FR) .................................. 02 15541

(51) Int. Cl.
*B21D 51/26* (2006.01)
*B25G 3/00* (2006.01)

(52) U.S. Cl. .................................. 29/890.14; 403/258
(58) Field of Classification Search ............. 29/890.14, 29/428, 436, 450, 506, 235; 285/355; 277/602, 277/608, 612, 614, 615
See application file for complete search history.

(56) References Cited

U.S. PATENT DOCUMENTS

| 3,150,889 | A | 9/1964 | Watts |
| 4,706,997 | A | 11/1987 | Carstensen |
| 2002/0140229 | A1 | 10/2002 | Otten et al. |
| 2002/0158469 | A1 | 10/2002 | Mannella et al. |

FOREIGN PATENT DOCUMENTS

| DE | 88 05 087 | 7/1988 |
| GB | 880283 | 10/1961 |
| JP | 06-213378 | 8/1994 |
| JP | 07-139666 | 5/1995 |

*Primary Examiner*—John C Hong
(74) *Attorney, Agent, or Firm*—Oblon, Spivak, McClelland, Maier & Neustadt, P.C.

(57) ABSTRACT

In a threaded connection with tapered male and female threads, an annular housing is provided in the vicinity of the free end of the female element, which housing receives a portion of a deformable sealing ring, which is radially compressed, while a retaining lip of the ring is immobilized in a further annular housing of the female element by a rib on the male element. Such a connection may find particular application for connecting pipes for hydrocarbon wells.

25 Claims, 2 Drawing Sheets

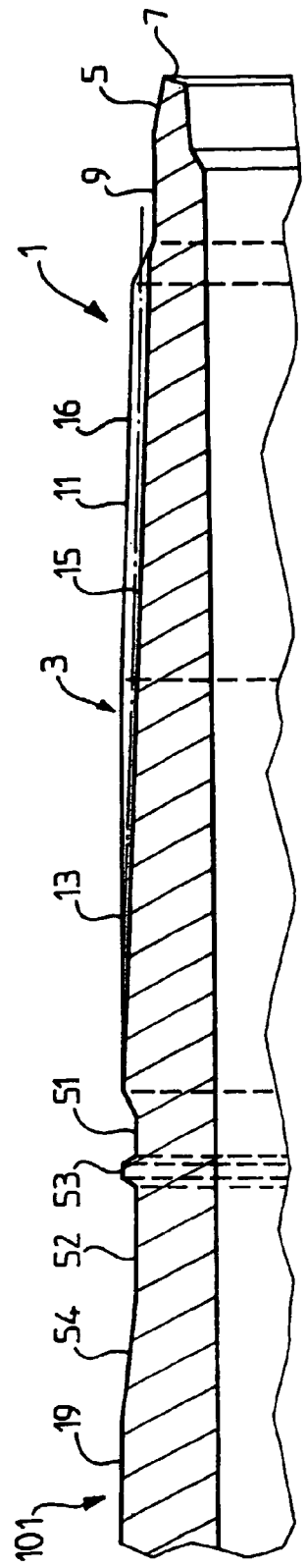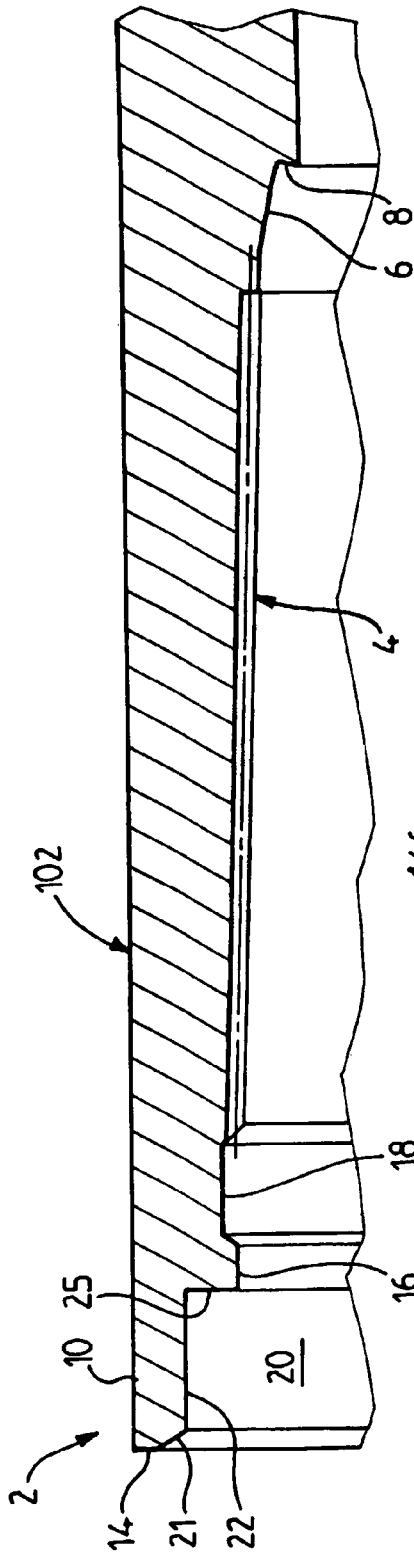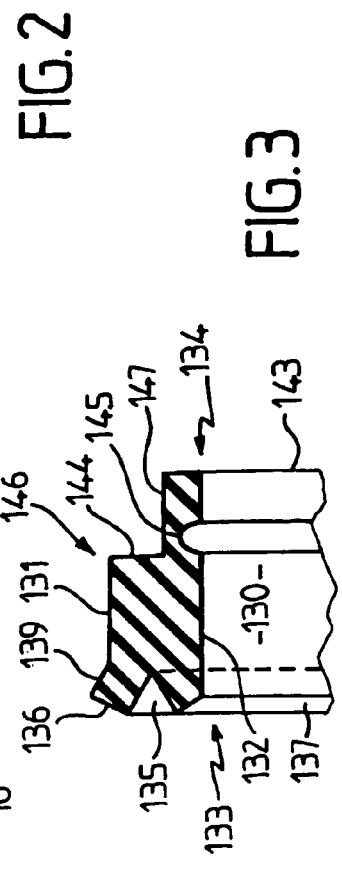

METHOD FOR PRODUCING A THREADED TUBULAR CONNECTION SEALED TO THE OUTSIDE

The invention relates to a method for producing a threaded tubular connection consisting of a male tubular element comprising a tapered male thread, a female tubular element comprising a tapered female thread which cooperates with said male thread, and a deformable sealing ring interposed between the male and female elements to oppose fluid communication between the outside of the threaded tubular connection and the zone of cooperation of said threads.

Such threaded tubular connections are known in which the male element is formed at the end of a great length pipe and the female element is formed at the end of a further great length pipe or a shorter tubular component such as a sleeve-like connection called "coupling", said connections allowing a plurality of pipes to be assembled end to end to form a string, in particular for a hydrocarbon well, in which said string serves for exploitation of hydrocarbons (tubing string) or to support the earth (casing string).

Long ago, the American Petroleum Institute introduced specifications API 5B and 5CT for such threaded connections with tapered threads of a rounded triangular shape or of a trapezoidal shape. However, such connections are only sealed by dint of grease charged with solid particles which fill the helical spaces between the male and female threads.

Proposals have been made to improve the seal characteristics of said connections, either by providing metallic sealing surfaces on the male and female elements which are under mutual contact pressure due to radial interference, or by means of sealing rings formed from deformable materials such as polytetrafluoroethylene, or using a combination of these means.

EP 0 488 912 A describes a threaded connection with a frustoconical metallic sealing surface disposed at the end of the male threaded element and a corresponding metallic sealing surface provided on the female threaded element. That threaded connection provides an excellent seal against fluids circulating both outside and inside the connection. However, fluid can infiltrate from the outside over all or a portion of the threads, risking corrosion of the latter when the fluid is corrosive.

The same advantages and disadvantages are exhibited by the threaded connection of DE 4 317 591 A, which has a deformable sealing ring disposed in an annular groove of the female threaded element and impressed into the male threads in the vicinity of the free end of the male element.

Such infiltration from the external medium is a particular problem when the threaded connections are on risers disposed between the sea bed and an offshore platform to isolate the production strings in submarine hydrocarbon fields from seawater, as seawater can cause severe corrosion in the highly confined spaces between the male and female threads.

U.S. Pat. No. 5,687,999 A describes a threaded connection with tapered threads having metallic sealing surfaces at two longitudinal ends of the threads, and which thus should be free of the disadvantages mentioned above. However, the cyclic stress to which submarine strings are subjected due to submarine currents tend to initiate cracks in the sealing surfaces by mutual sliding of the male and female surfaces. Of course, it can be contemplated preventing such sliding by placing the free ends of the threaded elements in axial abutment, but this would result in an increase in the thickness of the pipes at least at the ends thereof, and as a result would increase their price.

The aim of the invention is to eliminate the above disadvantages and as a result to produce a threaded tubular connection that is particularly suitable for risers subjected to cyclic stresses and to micro-deformations.

More particularly, the aim of the invention is to provide a threaded tubular connection the male and female elements of which are very close to those in current use for casing strings, in particular as regards their thickness, and which are therefore cheap to produce, and which can effectively isolate the threaded zone of the connection from the external environment, and more particularly from seawater.

It also should be possible to produce the threaded tubular connection of the invention both directly at the end of great length pipes (integral connection) and between a pipe and a coupling intended to connect two great length pipes (coupled connection).

The invention relates to a method of the type defined in the introduction, and provides that:

the sealing ring is placed around the male element beyond its thread with respect to its free end, the sealing ring comprising a body and a retaining lip with a radial thickness that is less than that of the body, extending axially towards the thread from a shoulder defining the body and having a thinned zone in the vicinity of the body, said thinned zone being in contact with an annular rib provided as a radial projection on the male element; and the free end of the male element is engaged in the female element and the male thread is made up into the female thread, the sealing ring being progressively introduced into a first annular housing provided in the female element in the form of an enlargement of its axial boring extending axially from its free end to a shoulder and having a peripheral surface adjacent to said shoulder which cooperates over at least a portion of its axial length with the radially outer surface of said sealing ring to radially compress the latter and establish a sealed contact between said radially outer and inner surfaces of the sealing ring on the one hand, and said peripheral surface of the first housing of the female element and the facing surface of the male element 1 on the other hand, the body then being pushed along the male element by the shoulder of said first housing of the female element after mutual abutment of the two shoulders, and the annular rib of the male element coming into contact with the retaining lip at the end of makeup beyond said thinned zone, to cause the retaining lip to penetrate into a second annular housing formed in the female element at an axial distance from the first housing to ensure axial retention of the sealing ring by the female element.

The terms "seal" and "sealing contact" as used here refer to measures that are not necessarily intended to completely prevent access of fluid in contact with the threads, but to at least limit such access to practically prevent renewal of fluid and as a result, prevent any substantial corrosion.

The connection of the invention has the advantage of permitting simple installation of the sealing ring, since once it has been placed on the rib of the male element without the need for heating, it is sufficient to screw the male element up into the female element to introduce the ring into the annular housings in the female element.

Optional characteristics of the invention, which are complementary or substitutional, are listed below:

the sealing ring is formed from a material selected from synthetic materials, malleable metals and composite materials;

the sealing ring is formed from a material having a low coefficient of friction with the material of the male element;

the sealing ring is formed from filled or unfilled polytetrafluoroethylene;

at the end of makeup, the annular rib of the male element brings the retaining lip into contact with the flank of the second annular housing of the female element disposed on the side of the shoulder of the first housing;

opposite to the free end of the male element, the male thread comprises a runout portion in which the thread radial height generally reduces from a nominal value to a zero value;

said peripheral surface of the first housing comprises a substantially cylindrical surface adjacent to its shoulder with a diameter that is substantially equal to that of a substantially cylindrical outer surface of the body;

said-peripheral surface of the first housing comprises a flared surface adjacent to the free end of the female element;

the male element has an axial abutment surface close to its free end, which surface can cooperate with an axial abutment surface of the female element to limit makeup;

said thinned zone is defined by an annular groove formed from the radial inner surface of the sealing ring and which can receive said annular rib of the male element to maintain the sealing ring in position after placing it on the male element;

prior to assembly, said radially inner face of the sealing ring has a substantially constant diameter with the exception of said annular groove;

said annular rib is defined by two annular grooves with bottom surfaces that are machined to be substantially cylindrical and of the same diameter to cooperate with said radially inner face;

the annular groove defining said annular rib that is opposite to the free end of the male element has a flank opposite to said rib that is slightly inclined with respect to the axis of the connection, which at the end of makeup comes into contact with the radially inner surface of the sealing ring to reinforce compression of said latter and the seal of the connection;

the body is solid and is connected to a head with a radial thickness that is greater than that of the body, extending axially from the body opposite to the retaining lip and having a recess disposed between its radially outer and inner surfaces;

the radial compression of the sealing ring includes radial compression of the head and its recess;

said recess is in the form of an annular groove radially separating the head into two portions respectively adjacent to the radially outer and radially inner surfaces;

the portion of the head adjacent to the radially outer surface bears on the substantially cylindrical surface of the first housing when makeup is complete;

said annular groove has a V shaped profile;

said outer surface of the head gradually flares from a substantially cylindrical surface of the body to the free end of the head;

the first and second housings of the female element together define an annular projection with a minimum diameter that is substantially equal to the maximum outer diameter of the retaining lip in order to overlap the latter during screwing;

when compression of the head commences, said annular projection is disposed beyond the annular rib on the male element on the free end side of the male element;

said annular projection is disposed in alignment with the annular rib of the male element when the two shoulders come into mutual abutment;

the second annular housing of the female element is in the form of a groove in one flank of which the female thread opens.

The invention also concerns a deformable sealing ring and a set for use in the method as defined above, as well as a threaded tubular connection obtained by the method.

The ring of the invention comprises a body and a retaining lip with a radial thickness that is less than that of the body, extending axially from a shoulder defining the body and having a thinned zone in the vicinity of the body which is defined by an annular groove formed in the radial inner surface of the sealing ring.

The set of the invention comprises:

a deformable sealing ring comprising a body and a retaining lip with a radial thickness that is less than that of the body, extending axially from a shoulder defining the body and having a thinned zone in the vicinity of the body;

a male tubular element comprising a tapered male thread and a radially projecting annular rib beyond said thread with respect to its free end; and a female tubular element comprising a tapered female thread which can cooperate with the male thread, a first annular housing provided in the female element in the form of an enlargement of its axial boring, extending axially from its free end to a shoulder and having a peripheral surface adjacent to said shoulder, and a second annular housing disposed at an axial distance from the first housing.

The connection of the invention comprises a male tubular element comprising a tapered male thread, a female tubular element comprising a tapered female thread which cooperates with the male thread, and a deformable sealing ring interposed between the male and female elements to oppose fluid communication between the outside of the threaded tubular connection and the zone of cooperation of said threads, the sealing ring being positioned axially between said threads and the free end of the female element and comprising a body and a retaining lip with a radial thickness that is less than that of the body, extending axially towards said threads from a shoulder defining the body and having a thinned zone in the vicinity of the body, the body being housed in a first annular housing provided in the female element in the form of an enlargement of its axial boring, extending axially from its free end to a shoulder and having a peripheral surface adjacent to said shoulder, which is in contact with the sealing ring for radial compression thereof, a radially projecting annular rib provided on the male element being in contact with the retaining lip beyond said thinned zone to cause the retaining lip to penetrate into a second annular housing formed in the female element at an axial distance from the first housing to ensure axial retention of the sealing ring by the female element.

Further features and advantages of the invention will become apparent from the following description made with reference to the accompanying drawings.

FIG. 1 is a cross-sectional half view of a male tubular element intended to form part of a threaded tubular connection of the invention.

FIG. 2 is a cross-sectional half view of a female tubular element intended to be associated with the male element of FIG. 1 to form the threaded tubular connection of the invention.

FIG. 3 is a cross-sectional half view of a sealing ring intended to provide the outer seal of the threaded tubular connection of the invention after making up the elements of FIGS. 1 and 2.

Figure 4:
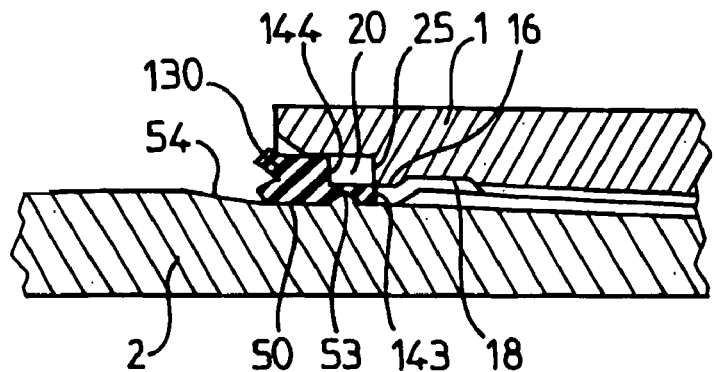
FIGS. 4 to 7 are cross-sectional half views illustrating different phases in making up the connection.
Figure 5:
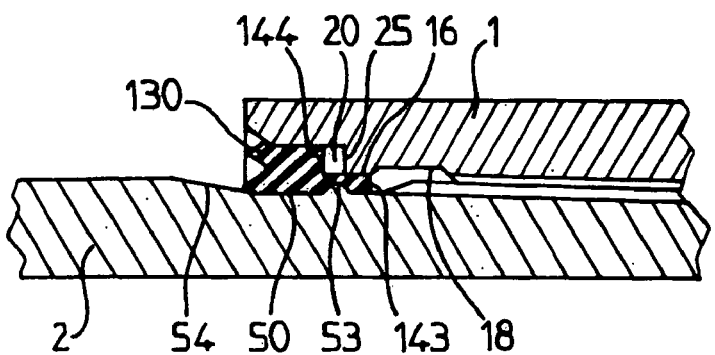

The drawings contain the essential elements of the features. Thus, they not only serve to provide a better understanding of the description, but also contribute to defining the invention if necessary.

The male threaded element or pin of FIG. 1 is formed at the end of a great length pipe 101 i.e. a pipe of several meters long. It comprises a continuous tapered male thread 3 having a trapezoidal shape. Over a portion 11 of its length, thread 3 is formed by perfect threads having a constant thread height equal to a nominal value between an envelope of thread roots 15 and an envelope of thread crests 16, both being frustoconical. Over the remaining portion 13 of the thread, the threads are imperfect or runout with an envelope of frustoconical thread roots extending that of the perfect threads and an envelope of thread crests constituted by the cylindrical outer peripheral surface 19 of the pipe 101.

Element 1 comprises a male lip 9 extending between its free end 7 and the thread 3. The free end can be defined by a flat surface perpendicular to the axis of the thread. Preferably, as shown, it is defined by a concave frustoconical surface 7 the apex half-angle of which is 75°, for example. This surface acts as an axial abutment during makeup of the male element into the female element and its effects have been described in more detail in EP 0 488 912 A.

The end surface 7 is connected to a frustoconical sealing surface 5, as also described in EP 0 488 912 A.

Beyond the thread 3 with respect to its free end 7, element 1 has two successive grooves 51 and 52 obtained by machining, including cylindrical bottom surfaces with the same diameter. The non-machined portion subsisting between the two grooves 51 and 52 forms an annular projection (rib) 53. The shape of the projection is designed not to cause deleterious fatigue effects. One conical surface 54 inclined at about 5° ensures the connection between the cylindrical bottom of the groove 52 to which it is connected via a fillet radius, and the outer cylindrical surface 19. At the end of the thread 13, the diameter of the thread roots is greater than the bottom of the groove 51, which means that the groove serves not only as a seat for the elastic seal but also as a groove for relaxing stresses in the threads.

The female threaded element 2 or box shown in FIG. 2 is formed at the end of a short tube or sleeve 102 called "coupling" which allows an assembly known as "threaded and coupled" of two great length pipes such as 101, the male threaded elements thereof being made up respectively into two female elements formed at the two ends of the coupling. In a variation, the female threaded element can be formed at the end of a great length pipe to allow it to be coupled to the pipe 101, elements 1 and 2 then forming an integral threaded connection.

Element 2 as shown comprises a continuous female tapered thread 4 with trapezoidal threads formed exclusively by perfect threads.

The geometrical characteristics of threads 3 and 4 are designed to allow them to cooperate.

Element 2 has a female lip 10 extending beyond the thread 4 to its free end defined by a flat face 14 perpendicular to the axis of the pipe 102. In an intermediate region of its length, lip 10 has an inner cylindrical surface 16 with a short axial length and with a diameter that is greater than the diameter of the surface 19 of pipe 101. Either side of surface 16, the lip is hollowed out internally to form an annular groove 18 on the side of the thread 4, and a housing 20 on the side of the free end 14, which are intended to receive respective portions of the sealing ring. The thread 4 opens into the groove 18 allowing the tool used to produce the thread to be disengaged. Housing 20 has a cylindrical surface 22 with its axis of revolution identical with the longitudinal axis of element 2 and a flat surface 25 perpendicular to the axis and adjacent to the surface 16. Housing 20 opens at end 14 of element 2 via a chamfer 21 intended to facilitate introduction of the male element 1 and of the ring into female element 2.

Beyond thread 4 with respect to the free end 14, female element 2 has a frustoconical abutment surface 8 that can cooperate with the surface 7 of the male element and a frustoconical sealing surface 6 that can cooperate with the sealing surface 5 of the male element.

The sealing ring 130 shown in FIG. 3 is formed from an elastic deformable sealing material, preferably with a low coefficient of friction, for example from polytetrafluoroethylene, polytetrafluoroethylene reinforced with glass fibres, polyamide or a soft metal such as copper.

Ring 130 has a toroidal form of revolution axially subdivided into three portions, namely a head 136, 137, a body 146 and a retaining lip 143.

The head is separated into two lips 136 and 137 via an annular groove 135 with a V-shaped profile formed in one end face 133 of the ring. Lip 136 is radially outwardly limited by a frustoconical surface 139 the diameter of which decreases from the face 133 towards the body, and which connects with the outer cylindrical surface 131 thereof. In contrast to the head, the body 146 is solid, i.e., does not include any recesses. Retaining lip 143 extends axially to the end surface 134 opposite to the face 133, and has an outer cylindrical surface 147 with a diameter that is smaller than that of the surface 131 and which is connected thereto via a flat shoulder 144. The ring 130 is radially limited inwardly by a cylindrical surface 132 which extends from the face 133 to the face 134 and is only interrupted by a groove 145 formed in the retaining lip 143 in the vicinity of the body 146, and which has a shape that is adapted to receive the projection (rib) 53 on the male element.

In the assembling mode shown in FIGS. 4 to 7, the sealing ring 134 is initially installed at ambient temperature on the cylindrical bottom of the grooves 51 and 52 of the male element 1, straddling the rib 53. Its designed flexibility allows it to pass over the threads.

The shape of the groove 145, which is adapted to the rib 53 of the male element, enables the sealing ring 134 to be retained on the male element against translation when screwing up thereof is commenced into the female element. The body 146 and lip 143 are then overlapped by the respective cylindrical surfaces 22 and 16 of the female element without stress (FIGS. 4 and 5), which has the effect of radially retaining the ring 130 when it is subjected to stresses.

Figure 6:
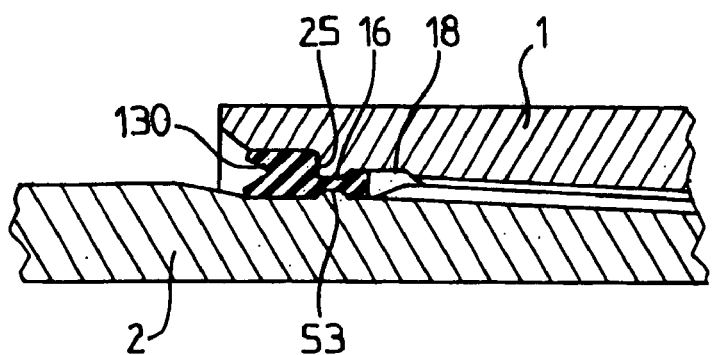
Figure 7:
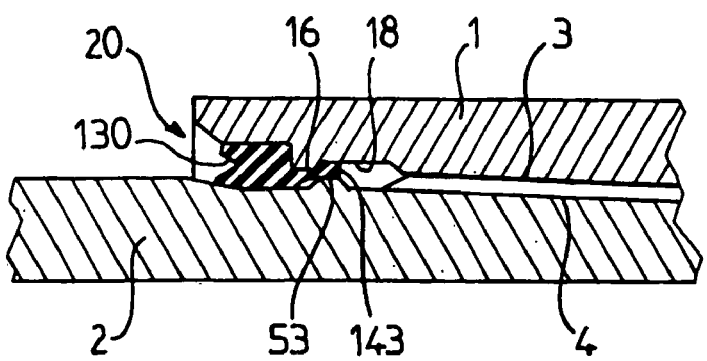

Axial retention of the ring on the male element then allows the head to penetrate into the housing 20, which necessitates more stress to deform the lip 136 with shrinkage of the groove (recess) 135. The ring stops penetrating into the housing 20 when the surface 25 of the housing 20 comes into abutment against the shoulder 144 of the ring, the groove 145 and the rib 53 being located facing the surface 16 (FIG. 6).

The ring then advances along the male element 1 while the rear portion of the lip 143 is lifted by the rib 53 of the male element 1 and penetrates into the groove 18 of the female element 2 which thus forms a housing for said rear portion. When makeup is complete, this rear portion is axially pinched between the rib 53 and the flank of the groove 18 adjacent to the surface 16, which pinching, along with the cooperation between the shoulders 25 and 144, axially immobilizes the ring 130 with respect to elements 1 and 2. At the same time, lip 137 is raised by the frustoconical surface 54, accentuating compression of the head of the ring and improving the seal at low pressures. The recess 135 also ensures a seal at high outer pressures of 150 to 400 bars, for example, the radial component of the forces exerted by the outer pressure on the flanks of the V-shaped recess 135 of the ring increasing the contact pressure resulting from radial interference of the lips 136, 137 between the surface 22 of the female housing and the male surface 54.

The invention claimed is:

1. A method for producing a threaded tubular connection including a male tubular element comprising a tapered male thread, a female tubular element comprising a tapered female thread that cooperates with the male thread, and a deformable sealing ring interposed between the male and female elements to oppose fluid communication between the outside of the threaded tubular connection and a zone of cooperation of the threads, the method comprising:
   placing the sealing ring around the male element beyond its thread with respect to its free end, the sealing ring comprising a body and a retaining lip with a radial thickness that is less than that of the body, extending axially towards the thread from a shoulder defining the body and having a thinned zone in a vicinity of the body, the thinned zone being in contact with an annular rib provided as a radial projection on the male element; and
   engaging the free end of the male element in the female element and the male thread into the female thread, the sealing ring being progressively introduced into a first annular housing provided in the female element in a form of an enlargement of its axial boring extending axially from its free end to a shoulder and having a peripheral surface adjacent to the shoulder that cooperates over at least a portion of its axial length with the radially outer surface of the sealing ring to radially compress the sealing ring and establish a sealed contact between (1) the radially outer and inner surfaces of the sealing ring, and (2) the peripheral surface of the first housing of the female element and the facing surface of the male element, the body then being pushed along the male element by the shoulder of the first housing of the female element, after mutual abutment of the two shoulders, and the annular rib of the male element coming into contact with the retaining lip at the end of makeup beyond the thinned zone, to cause the retaining lip to penetrate into a second annular housing formed in the female element at an axial distance from the first housing to ensure axial retention of the sealing ring by the female element.

2. A method according to claim 1, wherein the sealing ring is formed from a material selected from synthetic materials, malleable metals, and composite materials.

3. A method according to claim 1, wherein the sealing ring is formed from a material with a low coefficient of friction with the material from the male element.

4. A method according to claim 1, wherein the sealing ring is formed from filled or un-filled polytetrafluoroethylene.

5. A method according to claim 1, wherein at the end of makeup, the annular rib of the male element brings the retaining lip into contact with a flank of the second annular housing of the female element disposed on the side of the shoulder of the first housing.

6. A method according to claim 1, wherein opposite the free end of the male element, the male thread comprises runout threads having a radial height that decreases from a nominal value to a zero value.

7. A method according to claim 1, wherein the peripheral surface of the first housing comprises a substantially cylindrical surface adjacent to its shoulder with a diameter that is substantially equal to that of a substantially cylindrical outer surface of the body.

8. A method according to claim 1, wherein the peripheral surface of the first housing comprises a flared surface adjacent to the free end of the female element.

9. A method according to claim 1, wherein the male element has an axial abutment surface close to its free end, which surface is configured to cooperate with an axial abutment surface of the female element to limit makeup.

10. A method according to claim 1, wherein the thinned zone is defined by an annular groove formed in the radial inner surface of the sealing ring and is configured to receive the annular rib of the male element to maintain the sealing ring in position after placing the sealing ring on the male element.

11. A method according to claim 10, wherein prior to assembly, the radially inner face of the sealing ring has a substantially constant diameter with exception of the annular groove.

12. A method according to claim 11, wherein the annular rib is defined by two annular grooves with bottom surfaces that are machined to be substantially cylindrical and of a same diameter to cooperate with the radially inner face.

13. A method according to claim 12, wherein the annular groove defining the annular rib that is opposite to the free end of the male element has a flank opposite to the rib that is inclined with respect to the axis of the connection which at the end of makeup comes into contact with the radially inner surface of the sealing ring to reinforce compression of the sealing ring and the seal of the connection.

14. A method according to claim 1, wherein the body is solid and is connected to a head with a radial thickness that is greater than that of the body, extending axially from the body opposite to the retaining lip and having a recess disposed between its radially outer and inner surfaces.

15. A method according to claim 14, wherein the radial compression of the sealing ring includes radial compression of the head and its recess.

16. A method according to claim 15, wherein the recess is in a form of an annular groove radially separating the head into two portions respectively adjacent to the radially outer and radially inner surfaces.

17. A method according to claim 16, wherein the portion of the head adjacent to the radially outer surface bears on the substantially cylindrical surface of the first housing when makeup is complete.

18. A method according to claim 16, wherein the annular groove has a V shaped profile.

19. A method according to claim 14, wherein the outer surface of the head flares from a substantially cylindrical surface of the body to the free end of the head.

20. A method according to claim 1, wherein the first and second housings of the female element together define an annular projection with a minimum diameter that is substantially equal to a maximum outer diameter of the retaining lip to overlap the retaining lip during makeup.

21. A method according to claim 20, wherein when compression of the sealing ring commences, the annular projec tion is disposed beyond the annular rib on the male element on the free end side of the male element.

22. A method according to claim 20, wherein the annular projection is disposed in alignment with the annular rib of the male element when the two shoulders come into mutual abutment.

23. A method according to claim 1, wherein the second annular housing of the female element is in a form of a groove in one flank of which the female thread opens.

24. A set for use in the method according to claim 1, comprising:
   a deformable, sealing ring comprising a body and a retaining lip with a radial thickness that is less than that of the body, extending axially from a shoulder defining the body and having a thinned zone in the vicinity of the body;
   a male tubular element comprising a tapered male thread and a radially projecting annular rib beyond the thread with respect to its free end; and
   a female tubular element comprising a tapered female thread configured to cooperate with the male thread, a first annular housing provided in the female element in a form of an enlargement of its axial boring, extending axially from its free end to a shoulder and having a peripheral surface adjacent to the shoulder, and a second annular housing disposed at an axial distance from the first housing.

25. A threaded tubular connection obtained by the method of claim 1, comprising:
   a male tubular element comprising a tapered male thread;
   a female tubular element comprising a tapered female thread configured to cooperate with the male thread; and
   a deformable sealing ring interposed between the male and female elements to oppose fluid communication between the outside of the threaded tubular connection and the zone of cooperation of the threads, the sealing ring being positioned axially between the threads and the free end of the female element and comprising a body and a retaining lip with a radial thickness that is less than that of the body, extending axially towards said threads from a shoulder defining the body and having a thinned zone in a vicinity of the body, the body being housed in a first annular housing provided in the female element in a form of an enlargement of its axial boring, extending axially from its free end to a shoulder and having a peripheral surface adjacent to the shoulder, which is in contact with the sealing ring for radial compression thereof, a radially projecting annular rib provided on the male element being in contact with the retaining lip beyond the thinned zone to cause the retaining lip to penetrate into a second annular housing formed in the female element at an axial distance from the first housing to ensure axial retention of the sealing ring by the female element.

* * * * *